United States Patent
Chopra et al.

(10) Patent No.: US 11,301,652 B2
(45) Date of Patent: Apr. 12, 2022

(54) DYNAMIC PACKAGING DISPLAY WITH TEMPERATURE LOGGER

(71) Applicant: Xerox Corporation, Norwalk, CT (US)

(72) Inventors: Naveen Chopra, Oakville (CA); Nan-Xing Hu, Oakville (CA); Gregory McGuire, Oakville (CA); Ethan Shen, Toronto (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/014,599

(22) Filed: Sep. 8, 2020

(65) Prior Publication Data
US 2022/0075970 A1   Mar. 10, 2022

(51) Int. Cl.
   *G06K 7/10*      (2006.01)
   *G06Q 10/08*     (2012.01)

(52) U.S. Cl.
   CPC ........ *G06K 7/10405* (2013.01); *G06Q 10/087* (2013.01)

(58) Field of Classification Search
   CPC .. G06Q 10/087; G08Q 10/08; G06K 7/10405; G06K 19/0717; F25D 2700/16; G01K 3/04
   USPC ............ 235/98 R, 98 A, 487, 492, 385, 383; 340/572.1, 539.1, 588
   See application file for complete search history.

(56) References Cited

U.S. PATENT DOCUMENTS

| | | | |
|---|---|---|---|
| 2003/0099157 A1* | 5/2003 | Quine | G06K 19/0717 368/10 |
| 2004/0092023 A1* | 5/2004 | Wright | G01N 31/229 436/7 |
| 2005/0248455 A1* | 11/2005 | Pope | G06Q 30/06 340/539.27 |
| 2007/0273507 A1* | 11/2007 | Burchell | G01K 3/04 340/539.27 |
| 2010/0052909 A1* | 3/2010 | Doan | G06K 19/0716 340/572.1 |
| 2015/0048938 A1* | 2/2015 | Tew | G08B 21/182 340/517 |
| 2015/0353236 A1 | 12/2015 | Gentile et al. | |
| 2017/0229000 A1* | 8/2017 | Law | G01K 3/04 |

* cited by examiner

*Primary Examiner* — Suezu Ellis (57) ABSTRACT

An example dynamic packaging display includes a plurality of indicator lights, a temperature sensor, an internal clock, a processor, and a power source. The processor is communicatively coupled to the plurality of indicator lights, the temperature sensor, and the internal clock. The processor is to activate one of the plurality of indicator lights in response to an expiration of a period of time tracked by the internal clock or a temperature that is measured by the temperature sensor exceeding a temperature threshold. The power source is to provide power to the plurality of indicator lights, the temperature sensor, the internal clock, and the processor.

16 Claims, 6 Drawing Sheets

DYNAMIC PACKAGING DISPLAY WITH TEMPERATURE LOGGER

The present disclosure relates generally to displays for packaging and relates more particularly to a dynamic packaging display with temperature logger.

BACKGROUND

Some retail businesses use warehouses to store inventory. Some inventory may have a particular shelf life (e.g., edible products, some chemical products, medications, and the like). The warehouses may rely on "first-in, first-out" practices. In other words, the products that are the oldest may be sold first or removed first.

In addition, some products may be sensitive to heat. Thus, the products may spoil or be unusable when exposed to high temperatures. However, with current packaging, detecting whether a product was exposed to high temperatures is difficult to detect or track.

Proper restocking and inventory tracking in warehouses requires accurate and reliable labelling and item-by-item tagging to determine the age of products. This can be a time-consuming task with many opportunities for errors in label tagging, label reading, or misplaced items.

SUMMARY

According to aspects illustrated herein, there is provided a dynamic packaging display and a method for operating the same is provided. One disclosed feature of the embodiments is a dynamic packaging display comprising a plurality of indicator lights, a temperature sensor, an internal clock, a processor communicatively coupled to the plurality of indicator lights, the temperature sensor, and the internal clock, the processor to: activate one of the plurality of indicator lights in response to an expiration of a period of time tracked by the internal clock or a temperature that is measured by the temperature sensor exceeding a temperature threshold, and a power source to provide power to the plurality of indicator lights, the temperature sensor, the internal clock, and the processor.

Another disclosed feature of the embodiments is a method to operate a dynamic packaging display. The method comprises tracking, by a processor, a period of time via an internal clock of the dynamic packaging display, determining, by the processor, that an expiration time period has been reached based on the period of time that is tracked, activating, by the processor, an indicator light of a plurality of indicator lights of the dynamic packaging display, wherein the indicator light is associated with the expiration time period, and repeating, by the processor, the tracking, the determining, and the activating until a last indicator light of the plurality of indicator lights is activated.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an example dynamic packaging display with a temperature logger and a method for operating the same. As discussed above, some retail businesses use warehouses to store inventory. Some inventory may have a particular shelf life (e.g., edible products, some chemical products, medications, and the like). The warehouses may rely on "first-in, first-out" practices. In other words, the products that are the oldest may be sold first or removed first.

In addition, some products may be sensitive to heat. Thus, the products may spoil or be unusable when exposed to high temperatures. However, with current packaging, detecting whether a product was exposed to high temperatures is difficult to detect or track.

Proper restocking and inventory tracking in warehouses requires accurate and reliable labelling and item-by-item tagging to determine the age of products. This can be a time-consuming task with many opportunities for errors in label tagging, label reading, or misplaced items.

The present disclosure provides a dynamic packaging display with temperature logger that can provide a quick visual status of products within a warehouse. For example, the display may include a plurality of indicator lights. The indicator lights can be different colored light emitting diodes (LEDs). Different indicator lights may be activated based on the age of the product or exposure to excessive heat.

An employee in the warehouse can then simply note the indicator lights that are activated on a package to quickly detect whether a product needs to be removed. In addition, the indicator lighting may make it easier to determine if a product has expired in locations that have poor lighting. In addition, some labels may have small print that can be difficult to read and can lead to errors. The indicator lights of the dynamic packaging display may be easier to decipher and reduce potential errors.

Figure 1:
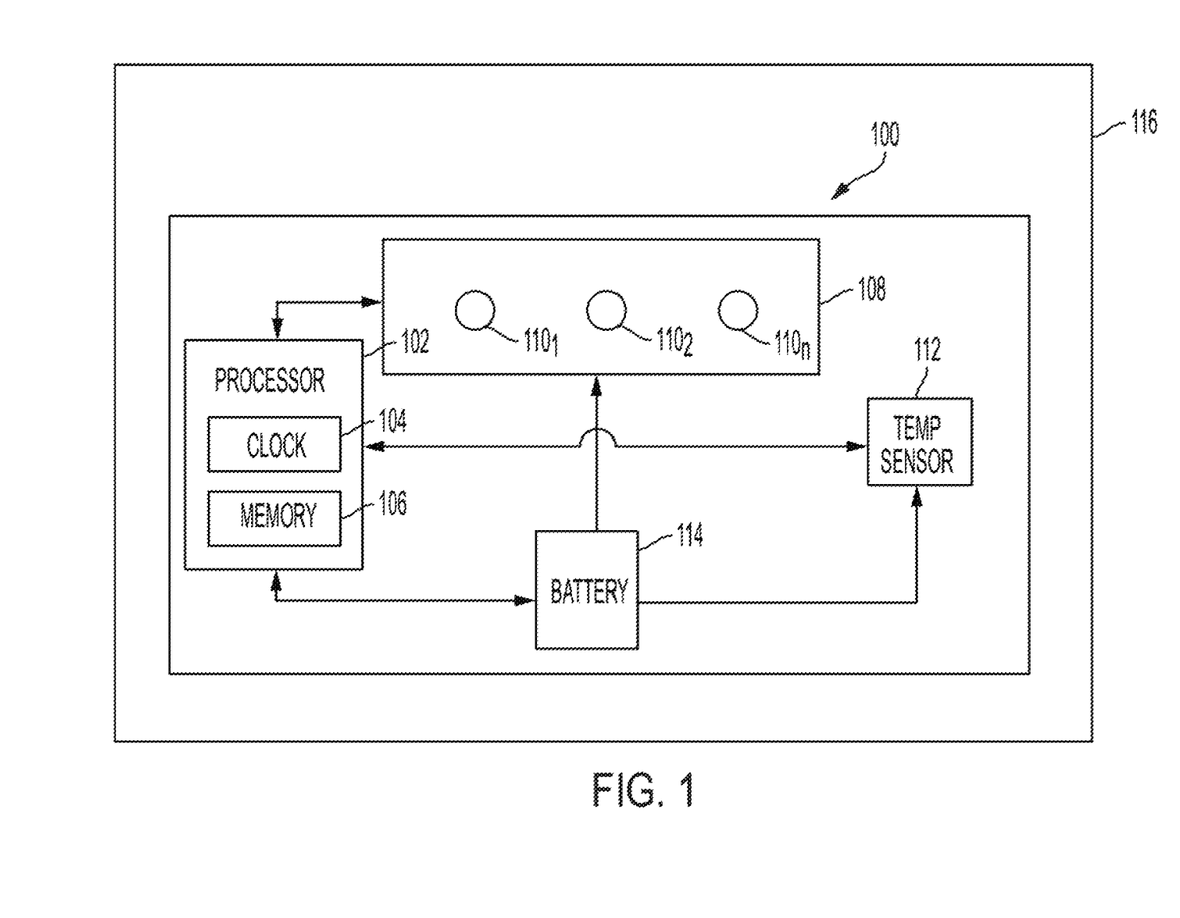
FIG. 1 illustrates a block diagram of an example apparatus of the present disclosure.

FIG. 1 illustrates an example apparatus 100 of the present disclosure. In one embodiment, the apparatus 100 may be a dynamic packaging display with temperature logger of the present disclosure. In one embodiment, the apparatus 100 may be affixed to a package 116. The apparatus 100 may indicate whether the product inside of the package 116 has expired or been comprised, as discussed in further details below. The package 116 may be a box, a plastic container, a bottle, and the like. The apparatus 100 may be affixed to the package 116 via an adhesive or mechanical coupling.

In one embodiment, the apparatus 100 may include a processor 102, an indicator light array 108, a temperature (temp) sensor 112, and a battery 114. The processor 102 may be communicatively coupled to the indicator light array 108 and indicator lights $110_1$ to $110_n$ (hereinafter also referred to individually as an indicator light 110 or collectively as indicator lights 110), the temperature sensor 112, and the battery 114. The processor 102 may control operation of the indicator lights 110, as described in further details below.

In one embodiment, the temperature sensor 112 may be a thermometer, a thermocouple, or any other type of temperature measuring device. The temperature sensor 112 may measure temperature and transmit the temperature measurements to the processor 102. The temperature measurements may be stored in the memory 106.

In one embodiment, the battery 114 may provide power to operate the indicator lights 110, the temperature sensor 112, and the processor 102. The battery 114 may be a printed battery. For example, the printed battery may be a zinc/manganese oxide ($MnO_2$) printed battery. The battery 114 may include other types of batteries, such as a thin film battery, a coin battery, and the like as a power source. The battery 114 may also be an integrated battery, a removable battery, or a battery printed directly onto part of the apparatus 100. For example, the battery 114 may be printed directly as part of the processor 102, the indicator light array 108, the temperature sensor 112, or any combination thereof.

Although FIG. 1 illustrates the use of a battery 114, it should be noted that a wireless power source may be used. For example, the apparatus 100 may be powered via a wireless power source instead of a battery 114.

The processor 102 may include a clock 104 and a memory 106. The clock 104 may be an internal clock to track time. As discussed in further details below, the processor 102 may activate different indicator lights 110 on the indicator light array 108 based on different expirations of time based on the clock 104.

In one embodiment, the memory 106 may be a non-transitory computer readable medium. Although the memory 106 is illustrated as local memory of the processor 102 (e.g., a local cache), it should be noted that the memory 106 may be an external memory device. For example, the memory 106 may be a random access memory (RAM), read only memory (ROM), a solid state drive, and the like. The memory 106 may store instructions executed by the processor 102 to perform the operations described herein. The memory 106 may also store the temperature measurements received from the temperature sensor 112, as noted above.

The memory 106 may also store thresholds to determine which indicator lights 110 to activate. For example, the thresholds may include a temperature threshold and an expiration time period. The temperature threshold and the expiration time period may be a function of a product stored in the package 116. For example, the temperature threshold may be a temperature at which the product in the package 116 may be compromised.

In one embodiment, the expiration time period may be a function of an expiration date of a product within the package 116. As discussed in further details below, each indicator light $110_1$ to $110_n$ may be associated with an expiration time period. For example, the indicator light array 108 may include three indicator lights 110. A total expiration time period for a product may be 3 months. Thus, the expiration time period for the first indicator light 110 may be 1 month, the expiration time period for the second indicator light 110 may be 2 months, and the expiration time period for the third indicator light 110 may be 3 months.

In one embodiment, the memory 106 may store different temperature thresholds and expiration time periods on different apparatuses 100. For example, the apparatus 100 or dynamic packaging display may be programmed for a particular product in the package 116. For example, a first product may be compromised if exposed to temperatures above 0 degrees Celsius and have an expiration time period of 1 year. A second product may be compromised if exposed to temperatures above 27 degrees Celsius and have an expiration time period of 3 months. Thus, the apparatus 100 for the first product may be programmed to store a temperature threshold of 0 degrees Celsius and an expiration time period of 1 year in the memory 106. The apparatus 100 for the second product may be programmed to store a temperature threshold of 27 degrees Celsius and have an expiration time period of 3 months.

In one embodiment, the indicator lights 110 may be light emitting diodes (LEDs). The indicator lights 110 may be arranged linearly or along a line to represent a time line in the indicator light array 108. The indicator lights 110 may be different colors to convey different messages. For example, the indicator light $110_1$ may be a green indicator light to indicate a new package 116. The indicator light $110_2$ may be a yellow indicator light to indicate that the package 116 is aging. The indicator light $110_3$ may be a red indicator light to indicate that the package 116 has expired and should be disposed of.

Although the colors of green, yellow, and red are used as examples, it should be noted that any color may be used for the indicator lights 110 to convey any desired message. In addition, it should be noted that different numbers of indicator lights 110 may be deployed for different colors. For example, a single green indicator light 110 may be used, multiple yellow indicator lights 100 may be used, and a single red indicator light 110 may be used.

In one embodiment, one or more of the indicator lights 110 may also flash on and off. Flashing the indicator lights 110 may convey a different message. For example, the last indicator light $110_n$ may be a red color. When the last indicator light $110_n$ is solid on, the red color may indicate that the package 116 is expired. However, if the last indicator light $110_n$ is flashing on and off, the flashing red color may indicate that a temperature threshold was exceeded and the package 116 may be compromised.

In one embodiment, the processor 102 may control operation of the indicator lights 110 based temperature measurements received from the temperature sensor 112 and an amount of time that has passed that is kept by the clock 104. For example, after the apparatus 100 is activated, the clock 104 may begin tracking time. The temperature sensor 112 may periodically take temperature measurements (e.g., every hour, every day, every week, and so forth). The temperature measurements may be stored in the memory 106. The apparatus 100 may also include an output interface (not shown) to allow the temperature measurements to be downloaded and examined. The temperature measurements may provide information about temperature stability in a particular warehouse or environment.

In one embodiment, the processor 104 may track the current time on the clock 102. If the current time exceeds an expiration time period of one of the indicator lights 110, the processor 104 may activate the appropriate indicator light 110.

The processor 104 may also compare the periodic temperature measurements to the temperature threshold. If a temperature measurement exceeds the temperature threshold, the processor 104 may activate a last indicator light (e.g., the indicator light $110_n$) in response to the temperature threshold being exceeded. In other words, rather than sequentially activating the indicator lights 110 as the expiration time periods are exceeded, the processor 104 may skip activation of some of the indicator lights 110 to activate the last indicator light $110_n$ when the temperature threshold is exceeded. In one embodiment, the processor 104 may flash the last indicator light $110_n$ to indicate that the temperature threshold was exceeded rather than the expiration time period being exceeded.

Figure 2:
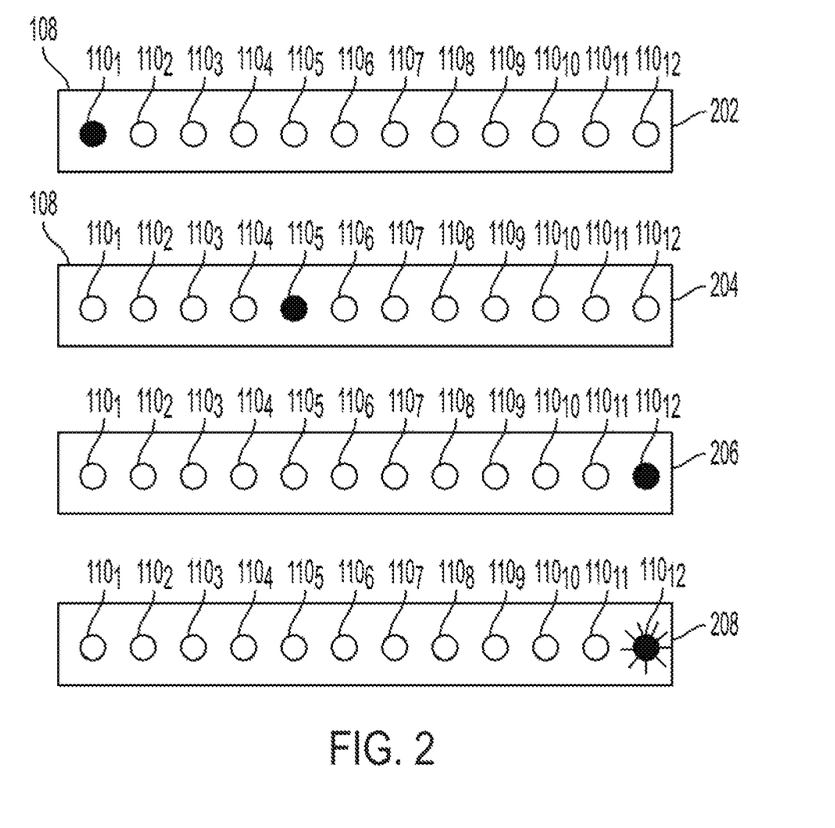
FIG. 2 illustrates an example operation of the apparatus of the present disclosure.

FIG. 2 illustrates an example of operation of the indicator lights 110 in the indicator light array 108. In the example illustrated in FIG. 2, the indicator light array 108 may include 12 indicator lights $110_1$ to $110_{12}$. The product may have an expiration time period of 11 months. The indicator light $110_1$ may indicate a new product. Each indicator light $110_2$ to $110_{12}$ may represent a respective number of months of the expiration time period. For example, indicator light $110_2$ may have an expiration time period of one month, the indicator light $110_3$ may have an expiration time period of two months, the indicator light $110_4$ may have an expiration time period of three months, and so forth, up to the indicator light $110_{12}$ that may have an expiration time period of eleven months.

In one embodiment, the indicator light $110_1$ may be green to indicate a new product. The indicator lights $110_2$ to $110_{11}$ may be yellow to indicate an aging product. In one embodiment, the indicator lights $110_2$ to $110_{11}$ may each be different colors that gradually change from a shade of green to dark orange. The last indicator light $110_{12}$ may be red to indicate an expired product.

At time 202, the apparatus 100 may be activated and the indicator light $110_1$ may be activated. As noted above, the indicator light $110_1$ may be a green color to indicate a new product. The clock 104 may begin keeping track of time and the temperature sensor 112 may take periodic temperature measurements.

At time 204, four months may have elapsed since the apparatus 100 was activated at time 202. In response, the processor 102 may activate the indicator light $110_5$ that is associated with a fourth month expiration time period. As noted above, the indicator light $110_5$ may be yellow or another color to indicate the product is aging.

At time 206, eleven months may have elapsed since the apparatus 100 was activated at time 202. In response, the processor 102 may activate the indicator light $110_{12}$ that is associated with an eleven month expiration time period. As noted above, the indicator light $110_{12}$ may be red to indicate that the product has expired.

In one embodiment, time 208 may represent a time period after time 202 and before time 206. In other words, time 208 represents a time after the apparatus 100 is activated, but before the expiration time period of the indicator light $110_{12}$ has been exceeded.

In one embodiment, a temperature measurement may exceed the temperature threshold stored in the memory 106. For example, the package 116 may be left out in the sun too long, a freezer that stores the package 116 may have failed overnight, the package 116 may have been left next to a furnace, and the like. In response, the processor 102 may immediately activate the indicator light $110_{12}$. In other words, the sequence of indicator lights $110_1$ to $110_{12}$ may be skipped to activate the indicator light $110_{12}$. Said another way, the indicator light $110_{12}$ may be activated even though the expiration time period of the indicator light $110_{12}$ has not expired or been exceeded by the time counted on the clock 104.

In one embodiment, the indicator light $110_{12}$ may be activated to be visually different than being solid on or continuously on. For example, the indicator light $110_{12}$ may be activated to flash on and off. As a result, a user may distinguish a product that is expired versus a product that has been comprised due to excessive heat or failure to keep the product below a desired temperature.

In one embodiment, a frequency of the flashing may indicate additional information. For example, a first, or slower frequency (e.g., on and off every second) may indicate that the temperature threshold was recently exceeded. For example, the freezer may have recently broken and the temperature threshold was recently exceeded (exceeded for less than some threshold period of time). A user may transfer the package 116 to a new freezer immediately. When the temperature measurement falls back below the threshold, the processor 102 may activate the previously activated indicator light 110. In another example, a second, or faster frequency (e.g., on and off every tenth of a second) may indicate that the temperature threshold has been exceeded for too long (e.g., exceeded for greater than some threshold period of time) and that the product should be disposed of or removed from inventory.

Figure 3A:
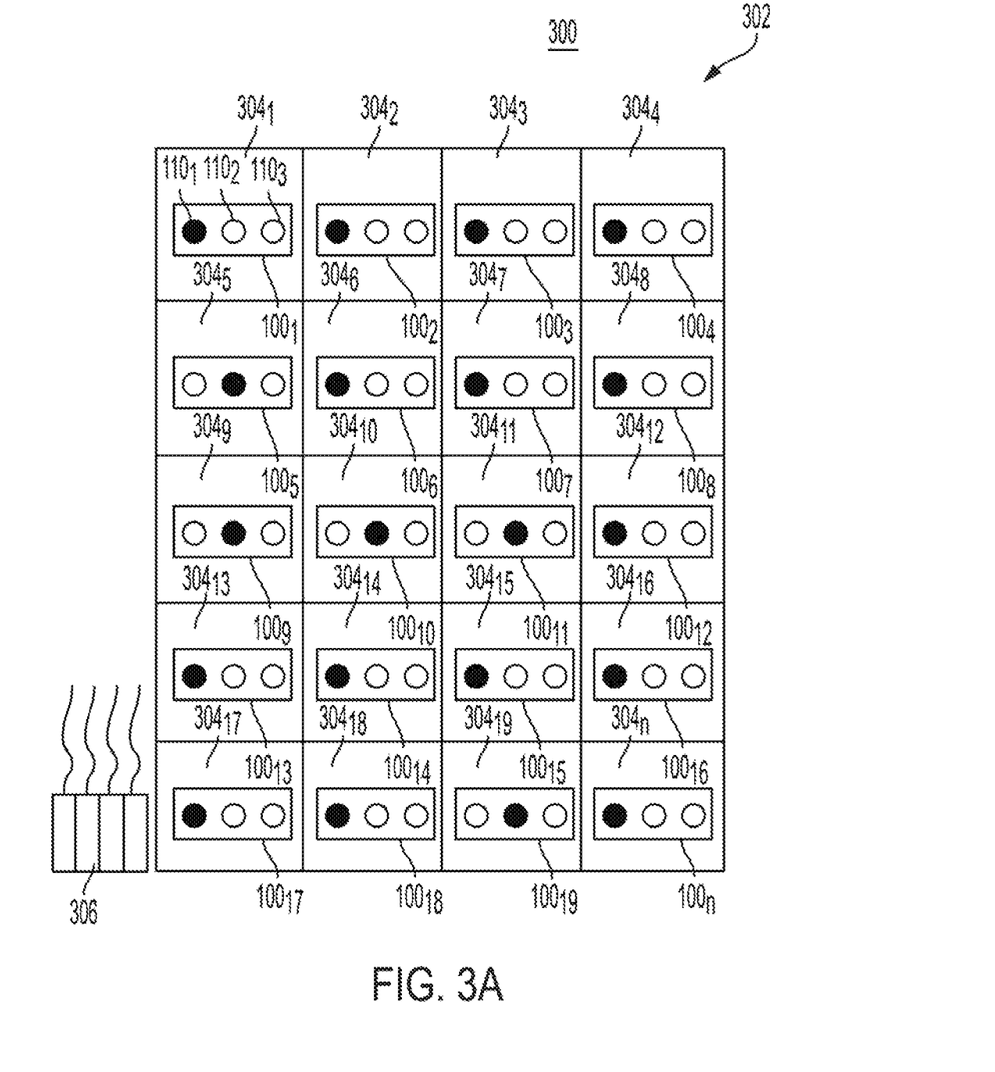
FIGS. 3A and 3B illustrate block diagrams of an example warehouse with packages that use the example apparatus of the present disclosure.
Figure 3B:
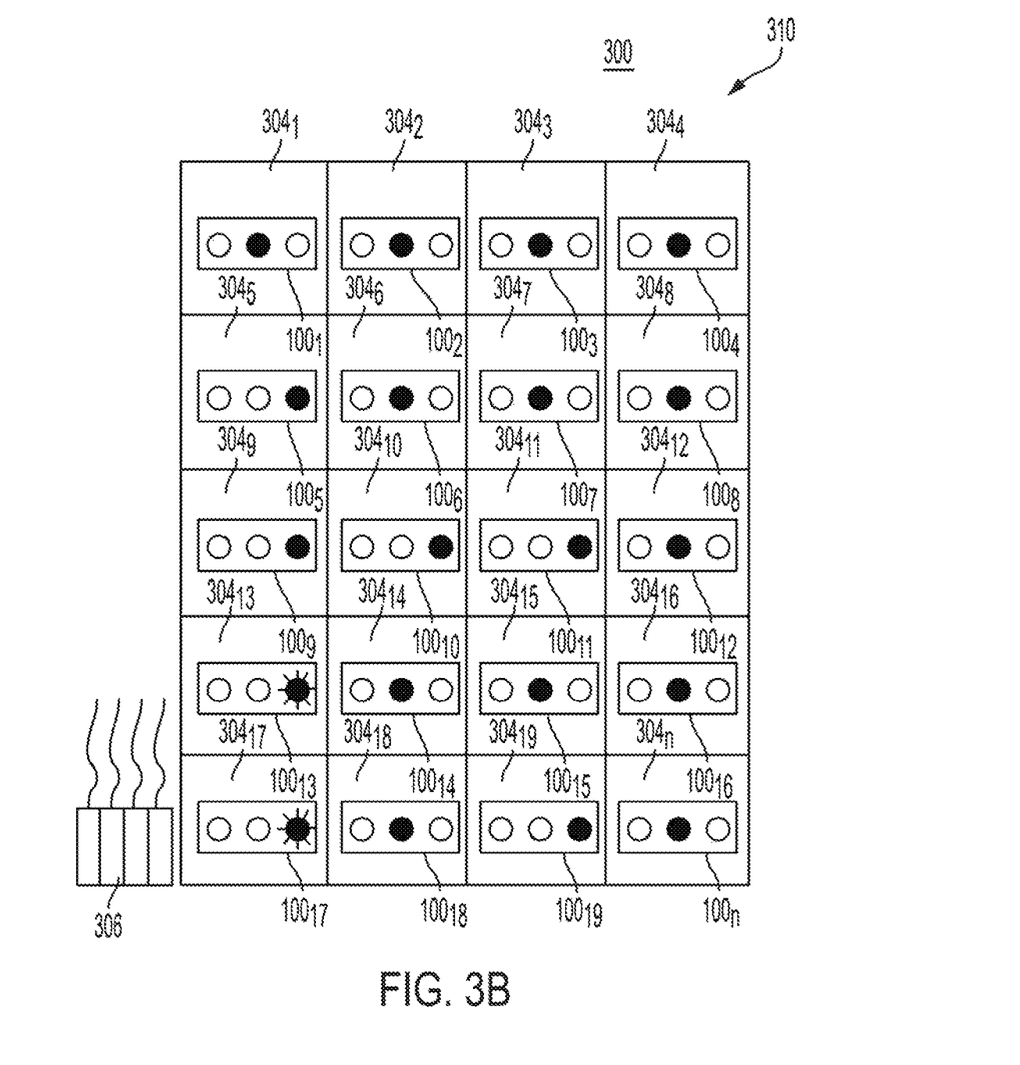

FIGS. 3A and 3B illustrate block diagrams of an example warehouse 300 with packages $304_1$ to $304_n$ (hereinafter also referred to individually as a package 304 or collectively as packages 304). Although FIGS. 3A and 3B illustrate an example in a warehouse 300 with packages 304, it should be noted that the apparatus 100 may be deployed in any location with any parcels, merchandise, and the like, that may have a limited shelf life and/or be perishable. In FIG. 3A at time 302, each package 304 may be monitored with a respective dynamic packaging display apparatus 100. For example, apparatuses $100_1$ to $100_n$ (hereinafter also referred to individually as an apparatus 100 or collectively as apparatuses 100) may be coupled to packages $304_1$ to $304_n$, respectively. In the example illustrated in FIGS. 3A and 3B, the apparatuses 100 may include three indicator lights $110_1$, $110_2$, and $110_3$. The first indicator light $110_1$ may indicate that the respective package 304 is new. The second indicator light $110_2$ may indicate that the respective package 304 is aging. The third indicator light $110_3$ may indicate that the respective package 304 has expired. In one embodiment, the indicator lights $110_1$, $110_2$, and $110_3$ may be green, yellow, and red, respectively.

When a user walks into the warehouse 300, the user may quickly discern the status of the packages 304 by looking at the indicator lights 110 of the respective dynamic packaging display apparatuses 100 affixed to the respective packages 304. At time 302, packages $304_1$-$304_4$, $304_6$-$304_8$, $304_{12}$-$304_{18}$, and $304_n$ may be new packages 304. For example, the first indicator light $110_1$ on the respective apparatus $100_1$-$100_4$, $100_6$-$100_8$, $100_{12}$-$100_{18}$, and $100_n$ may be activated. However, the packages $304_{13}$ and $304_{17}$ may be located near a radiator or heater 306. The packages 304 may contain a product that has a temperature threshold of 20 degrees Celsius. Packages $304_5$, $304_9$-$304_{11}$, and $304_{18}$ may be aged 30 days as indicated by activation of the indicator light $110_2$ on the respective apparatuses $100_5$, $100_8$-$100_{11}$, and $100_{19}$.

FIG. 3B illustrates the warehouse 300 at time 310, which may represent a time after the time 302 illustrated in FIG. 3A. For example 30 days after time 302. The expiration time period of the packages 304 may be 60 days. Thus, activation of the indicator light $110_2$ may indicate that at least 30 days has passed since the dynamic packaging display apparatus 100 was activated. Activation of the indicator light $110_3$ may indicate that at least 60 days has passed and the package 304 has expired.

At time 310, packages $304_1$-$304_4$, $304_6$-$304_8$, $304_{12}$, $304_{14}$-$304_{16}$, $304_{18}$, and $304_n$ may have aged 30 days. As a result, the indicator light $110_2$ may be activated on the respective apparatus $100_1$-$100_4$, $100_6$-$100_8$, $100_{12}$, $100_{14}$-$100_{16}$, $100_{18}$, and $100_n$. The packages $304_5$, $304_9$-$304_{11}$, and $304_{18}$ may be expired, as indicated by activation of the indicator light $110_3$ on the respective apparatuses $100_5$, $100_8$-$100_{11}$, and $100_{19}$.

In addition, the indicator light $110_3$ may be activated on the packages $304_{13}$ and $304_{17}$. For example, due to the heat from the radiator 306, the temperature threshold on the apparatuses $100_{13}$ and $100_{17}$ may have been exceeded. As a result, even though the expiration time period of 60 days has not been exceeded, the indicator light $100_3$ may be activated due to the temperature threshold being exceeded.

In one embodiment, the indicator lights $110_3$ on the apparatuses $100_{13}$ and $100_{17}$ may be flashing. The flashing indicator lights $110_3$ may indicate that the packages $304_{13}$ and $304_{17}$ may have been compromised due to temperature rather than the expiration time period.

As a result, when a user walks into the warehouse 300 at time 310, the user can quickly identify which packages 304 should be removed from inventory. The user can look at the indicator lights 110 on the apparatuses 100 and see that packages $304_5$, $304_9$-$304_{11}$, and $304_{19}$ should be removed due to the expiration time period being exceeded and that packages $304_{13}$ and $304_{17}$ should be removed due to possibly being compromised due to high temperatures.

In other words, the user can quickly determine which packages 304 may be kept in inventory and which packages 304 should be removed. The decision can be made in low light. In addition, the potential for errors may be greatly reduced as the user may simply have to look at which indicator light 110 is activated on each apparatus 100 of each package 304.

Figure 4:
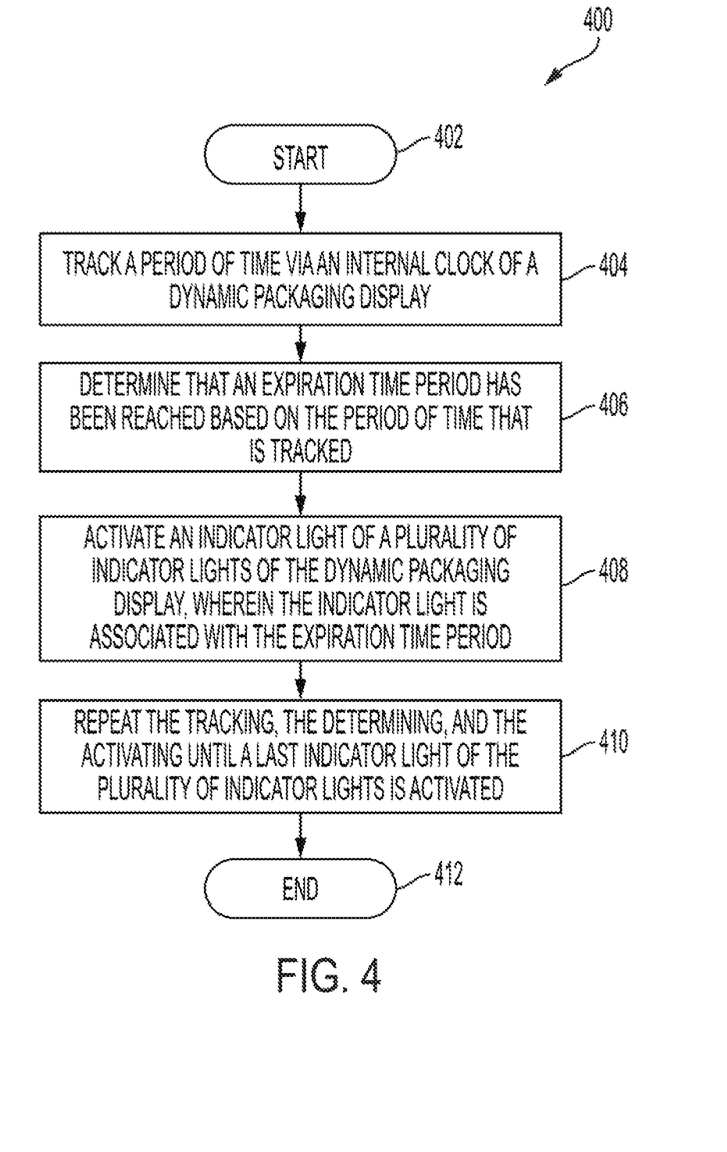
FIG. 4 illustrates a flowchart of an example method for operating indicator lights of a dynamic packaging display of the present disclosure.
Figure 5:
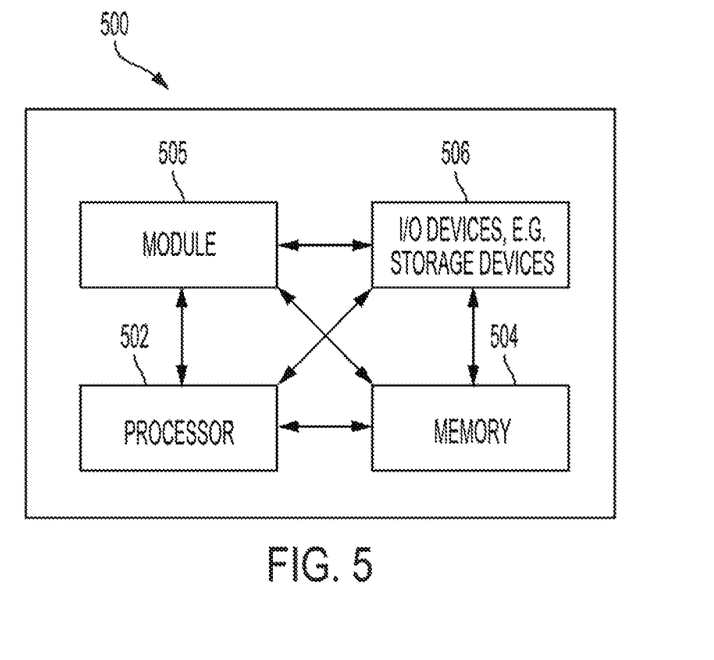
FIG. 5 illustrates a high-level block diagram of an example computer suitable for use in performing the functions described herein.

FIG. 4 illustrates a flowchart of an example method 400 for operating indicator lights of a dynamic packaging display of the present disclosure. In one embodiment, one or more blocks of the method 400 may be performed by the dynamic packaging display apparatus 100, or an apparatus 500, as illustrated in FIG. 5 and discussed below.

At block 402, the method 400 begins. At block 404, the method 400 tracks a period of time via an internal clock of the dynamic packaging display. For example, after the dynamic packaging display apparatus 100 is activated, the internal clock of the processor may begin tracking time.

At block 406, the method 400 determines that an expiration time period has been reached based on the period of time that is tracked. For example, local memory of the processor may store expiration time periods associated with indicator lights of an indicator light array. The processor may compare the amount of time that has passed based on the internal clock to the expiration time period.

At block 408, the method 400 activates an indicator light of a plurality of indicator lights of the dynamic packaging display, wherein the indicator light is associated with the expiration time period. In one embodiment, each indicator light may be associated with an expiration time period. When the respective expiration time period is exceeded the indicator light may be activated.

For example, a first indicator light may be associated with an expiration time period of 7 days. A second indicator light may be associated with an expiration time period of 14 days. When the internal clock reaches 7 days, the first indicator light may be activated. When the internal clock reaches 14 days, the first indicator light may be deactivated and the second indicator light may be activated.

In one embodiment, each expiration time period may be gradually larger until an expiration time period of a product is reached. For example, if the expiration time period of a product is 1 year and there are 5 indicator lights, the first indicator light may be time=0 indicating that dynamic packaging display has been activated. The second indicator light may have an expiration time period of 3 months. The third indicator light may have an expiration time period of 6 months. The fourth indicator light may have an expiration time period of 9 months. The fifth indicator light may have an expiration time period of 12 months.

At block 410, the method 400 repeats the tracking, the determining, and the activating until a last indicator light of the plurality of indicator lights is activated. For example, the indicator lights may be activated in order of increasing expiration time periods associated with each of the indicator lights until the last indicator light is activated. When the last indicator light is activated, the dynamic packaging display apparatus may indicate that the product or package has expired.

In one embodiment, the dynamic packaging display apparatus may include a temperature sensor. The method 400 may monitor temperatures that are measured by the temperature sensor. The temperature measurements may be taken periodically (e.g., every hour, every day, every week, and so forth).

The memory of the dynamic packaging display apparatus may also store a temperature threshold. The method 400 may detect a temperature measurement exceeds the threshold. In response, the method 400 may activate the last indicator light of the indicator light array. Using the example above, the clock may indicate that 6 months has passed, so the third indicator light may be activated. However, a temperature measurement may exceed the temperature threshold. As a result, the method 400 may activate the last indicator light even though the clock has not reached the expiration time period of the last indicator light (e.g., 12 months).

In one embodiment, when the last indicator light is activated in response to the temperature threshold being exceeded, the indicator light may flash. Flashing the indicator light may allow a user to quickly determine that the product may have been exposed to undesirable temperatures.

In one embodiment, the temperature measurements may be stored in memory. The dynamic packaging display apparatus may include an interface to allow the temperature measurements to be downloaded or communicated to a server for analysis. The temperature measurements may provide information associated with temperature stability of the warehouse for all of the products and/or packages. At block 412, the method 400 ends.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for operating indicator lights of a dynamic packaging display, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for operating indicator lights of a dynamic packaging display (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for operating indicator lights of a dynamic packaging display (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A dynamic packaging display, comprising:
    a plurality of indicator lights;
    a temperature sensor;
    an internal clock;
    a processor communicatively coupled to the plurality of indicator lights, the temperature sensor, and the internal clock, the processor to:
        track a period of time via the internal clock of the dynamic packaging display;
        determine that an expiration time period has been reached based on the period of time that is tracked;
        activate an indicator light of the plurality of indicator lights of the dynamic packaging display, wherein the indicator light is associated with the expiration time period;
        repeat the tracking, the determining, and the activating until a last indicator light of the plurality of indicator lights is activated;
        monitor temperatures that are measured by the temperature sensor of the dynamic packaging display;
        detect that a temperature of the temperatures that are measured has exceeded a temperature threshold; and
        activate the last indicator light of the plurality of indicator lights in response to detecting that the temperature of the temperatures that are measured exceeds the temperature threshold; and
    a power source to provide power to the plurality of indicator lights, the temperature sensor, the internal clock, and the processor.

2. The dynamic packaging display of claim 1, wherein the plurality of indicator lights comprises light emitting diodes (LEDs).

3. The dynamic packaging display of claim 1, wherein the plurality of indicator lights comprises a plurality of different colors.

4. The dynamic packaging display of claim 3, wherein one of the plurality of different colors represents a new package.

5. The dynamic packaging display of claim 3, wherein one of the plurality of different colors represents an aged product.

6. The dynamic packaging display of claim 3, wherein one of the plurality of different colors represents an expired product.

7. The dynamic packaging display of claim 1, wherein the plurality of indicator lights is arranged in a linear display, wherein each one of the indicator lights is to represent a time period.

8. The dynamic packaging display of claim 7, wherein each one of the plurality of indicator lights is associated with a respective expiration time period.

9. The dynamic packaging display of claim 8, wherein the processor is further to:
    activate the plurality of indicator lights a single indicator light at a time after each respective expiration time period has expired.

10. The dynamic packaging display of claim 1, wherein the temperature threshold is a function of a product.

11. The dynamic packaging display of claim 1, further comprising:
    a memory to store periodic temperature measurements performed by the temperature sensor.

12. A method to operate a dynamic packaging display, comprising:
    tracking, by a processor, a period of time via an internal clock of the dynamic packaging display;
    determining, by the processor, that an expiration time period has been reached based on the period of time that is tracked;
    activating, by the processor, an indicator light of a plurality of indicator lights of the dynamic packaging display, wherein the indicator light is associated with the expiration time period;
    repeating, by the processor, the tracking, the determining, and the activating until a last indicator light of the plurality of indicator lights is activated;
    monitoring, by the processor, temperatures that are measured by a temperature sensor of the dynamic packaging display;
    detecting, by the processor, that a temperature of the temperatures that are measured has exceeded a temperature threshold; and
    activating, by the processor, the last indicator light of the plurality of indicator lights in response to the detecting that the temperature of the temperatures that are measured exceeds the temperature threshold.

13. The method of claim 12, wherein the activating the last indicator light comprises flashing the last indicator light to indicate that the temperature threshold was exceeded.

14. The method of claim 12, further comprising:
   storing, by the processor, the temperatures that are measured in a memory.

15. The method of claim 12, wherein the activating is performed one indicator light at a time in order of expiration time periods associated with each one of the plurality of indicator lights.

16. The method of claim 12, wherein the expiration time period is a function of a product associated with the dynamic packaging display.

* * * * *